(12) United States Patent
Yamada et al.

(10) Patent No.: US 8,506,691 B2
(45) Date of Patent: Aug. 13, 2013

(54) SHAPED HEAT STORAGE MATERIALS INCLUDING HEAT TRANSFER MEMBERS

(75) Inventors: Shigeki Yamada, Nagoya (JP); Masahiro Sugiura, Obu (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 276 days.

(21) Appl. No.: 13/178,703

(22) Filed: Jul. 8, 2011

(65) Prior Publication Data

US 2012/0012474 A1 Jan. 19, 2012

(30) Foreign Application Priority Data

Jul. 13, 2010 (JP) .................................. 2010-158753

(51) Int. Cl.
*F02M 25/08* (2006.01)
(52) U.S. Cl.
USPC .................. 96/146; 96/153; 123/519; 165/10

(58) Field of Classification Search
USPC ............. 95/146; 96/146, 147, 153; 123/519; 165/10
See application file for complete search history.

(56) References Cited

U.S. PATENT DOCUMENTS

| 6,689,196 | B2 * | 2/2004 | Amano et al. ................... 96/112 |
| 7,670,412 | B2 * | 3/2010 | Kido et al. ....................... 96/147 |
| 7,841,321 | B2 * | 11/2010 | Kosugi et al. .................. 123/519 |
| 7,909,919 | B2 * | 3/2011 | Kosugi et al. .................... 96/126 |
| 8,323,450 | B2 * | 12/2012 | Seki ............................... 156/335 |
| 2005/0247202 | A1 * | 11/2005 | Seki ................................. 96/146 |
| 2009/0266236 | A1 * | 10/2009 | Kosugi et al. ................... 96/152 |
| 2012/0006504 | A1 * | 1/2012 | Sugiura .......................... 165/10 |

FOREIGN PATENT DOCUMENTS

JP 2005-233106 9/2005
JP 2010-096117 4/2010

* cited by examiner

*Primary Examiner* — Frank Lawrence, Jr.
(74) *Attorney, Agent, or Firm* — Ladas & Parry, LLP

(57) ABSTRACT

A shaped heat storage material has a shaped body composed of a binder and heat storage capsules containing a heat storage material therein. And, the shaped body has at least one of a projection, a depressed portion and a hollow structure defining a hollow space therein.

7 Claims, 2 Drawing Sheets

SHAPED HEAT STORAGE MATERIALS INCLUDING HEAT TRANSFER MEMBERS

CROSS-REFERENCES TO RELATED APPLICATIONS

This application claims priority to Japanese patent application serial number 2010-158753, the contents of which are incorporated herein by reference.

BACKGROUND OF THE INVENTION

1. Field of the Invention

This disclosure relates to heat storage materials used for treatment of vaporized fuel and adsorbent canisters containing such heat storage material.

2. Description of the Related Art

A vehicle such as gasoline vehicle has an adsorbent canister (also, called as fuel vapor treating apparatus) filled with an adsorbent capable of adsorbing and desorbing fuel vapor vaporized in a fuel tank in order to prevent the fuel vapor from flowing outside of the vehicle. The adsorbent canister temporarily traps the fuel vapor while the vehicle is parked. While the vehicle is driving, the fuel vapor trapped in the adsorbent canister is removed by flowing ambient air into the adsorbent canister, and then the fuel vapor mixed with the ambient air is burned in an internal combustion engine of the vehicle. In a case that the adsorbent is composed of activated carbon or the like, as the temperature of the adsorbent becomes higher, the adsorbent has lower adsorption capacity. Thus, when the fuel vapor adsorbs onto the adsorbent, the temperature of the adsorbent increases due to exotherm caused by adsorption of the fuel vapor, so that adsorption ability of the adsorbent decreases. On the contrary, when the fuel vapor desorbs from the adsorbent, the temperature of the adsorbent decreases due to endotherm caused by desorption of the fuel vapor, so that desorption ability of the adsorbent decreases.

Japanese Laid-Open Patent Publication No. 2005-233106 discloses an adsorbent canister filled with a granulated adsorbent and a shaped heat storage material. The shaped heat storage material is made by enclosing a phase-change material capable of absorbing and releasing heat depending on its liquid-solid phase change into micro capsules and shaping the micro capsules with a binder into ball shape, cylinder shape, polygonal shape or the like. Accordingly, when the fuel vapor adsorbs onto the adsorbent, increase in temperature of the adsorbent can be suppressed due to endotherm caused by melting of the phase-change material in the microcapsules, whereas when the fuel vapor desorbs from the adsorbent, decrease in temperature of the adsorbent can be suppressed due to exotherm caused by solidification of the phase-change material. Therefore, temperature alteration of the adsorbent caused by adsorption and desorption of the fuel vapor can be prevented, so that it is able to improve adsorption performance and desorption performance of the adsorbent.

The binder is usually composed of a thermosetting resin such as phenol resin or acrylic resin. Because such thermosetting resin usually has low thermal conductivity, heat is hardly transferred between a center region and a surface region of the shaped heat storage material. Therefore, there has been need for improved shaped heat storage materials.

SUMMARY OF THE INVENTION

One aspect of this disclosure includes a shaped heat storage material having a heat-transfer member made from a high thermal conducting material and heat storage capsules that contains therein phase-change material capable of adsorbing and releasing heat depending on temperature alteration and are disposed around the heat-transfer member.

In accordance with this aspect, the heat-transfer member can improve heat conductivity in the shaped heat storage material. Thus, heat can be easily transferred between the center region and the surface region of the shaped heat storage material, so that it is able to effectively utilize latent heat of the phase-change material in the enter region of the shaped heat storage material.

DETAILED DESCRIPTION OF THE PREFERRED EMBODIMENTS

Each of the additional features and teachings disclosed above and below may be utilized separately or in conjunction with other features and teachings to provide improved heat storage materials. Representative examples, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

A first embodiment of this disclosure will be described in reference to attached drawings. In this embodiment, an adsorbent canister (fuel vapor treating apparatus) containing shaped heat storage materials and attached to a vehicle such as automobile is shown. For convenience of explanation, directions (right, left, front and rear) are defined based on the adsorbent canister shown in FIG. 1.

Figure 1:
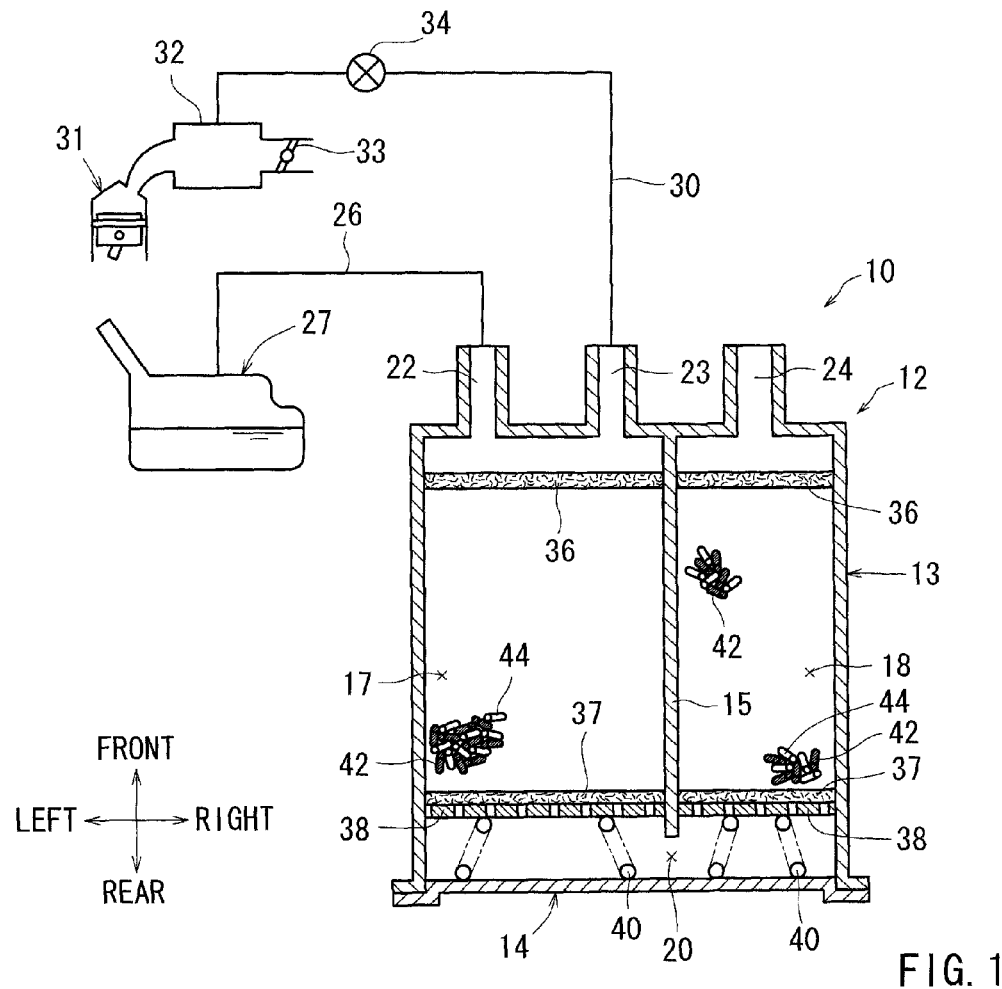
FIG. 1 is a schematic cross-sectional view of an adsorbent canister connected to a fuel tank and to an internal combustion engine in a first embodiment.

As show in FIG. 1, an adsorbent canister 10 has a housing 12 made from resin materials. The housing 12 is composed of a housing body 13 formed in a hollow cylinder shape with a closed front end (upper end in FIG. 1) and an open rear end (lower end in FIG. 1) and a cover 14 configured to close the rear end of the housing body 13. An inner space of the housing body 13 is divided into a main chamber 17 at a left side and an auxiliary chamber 18 at a right side by a partition wall 15. A communication chamber 20 is defined at a rear section of the housing body 13 near the cover 14 such that the main chamber 17 and the auxiliary chamber 18 are fluidly connected with each other via the communication chamber 20.

The housing body 13 has on its front surface (an upper surface in FIG. 1) a vapor introducing port 22 and an exhaust port 23 each fluidly connecting with the main chamber 17 and an air communicating port 24 fluidly communicating with the auxiliary chamber 18. The vapor introducing port 22 is connected with a fuel tank 27 (in detail, an upper section of the fuel tank 27 where gases are reserved) via a vapor pipe 26. The exhaust port 23 is connected to an air intake pipe 32 for an internal combustion engine 31 via a purge pipe 30. The air intake pipe 32 is provided with a throttle valve 33 for controlling intake airflow. The purge pipe 30 is connected to the air intake pipe 32 downstream of the throttle valve 33 (i.e., between the internal combustion engine 31 and the throttle valve 33). The purge pipe 30 is provided with a purge valve 34. The air communicating port 24 is open to the atmosphere.

The main chamber 17 is equipped with a front filter 36 at a front end and a rear filter 37 at a rear end. The auxiliary chamber 18 is also equipped with a front filter 36 and a rear filter 37 in a same manner. Each of the filters 36 and 37 is made of a resin-based non-woven cloth, urethane foam or the like. In the main chamber 17 and the auxiliary chamber 18, porous plates 38 are disposed along a rear surface of each rear filter 37. In addition, spring members 40 each composed of a coil spring are disposed between the porous plates 38 and the cover 14.

In the main chamber 17 and the auxiliary chamber 18, a mixture of a granular-shaped adsorbent 42 and a granular-shaped heat storage material 44 is filled between the front filters 36 and the rear filters 37. The adsorbent 42 can be made from known materials suitable for adsorbent, so that such materials will not be described in detail. For example, the adsorbent 42 can be made of granulates of activated carbon. In addition, the granulates of activated carbon can include, for example, granular activated carbon (crushed activated carbon) and extruded activated carbon formed by shaping powdered activated carbon with a binder. The adsorbent 42 can be formed in, e.g., ball, cylinder, polygonal prism or concave polygonal prism shape.

Figure 2:
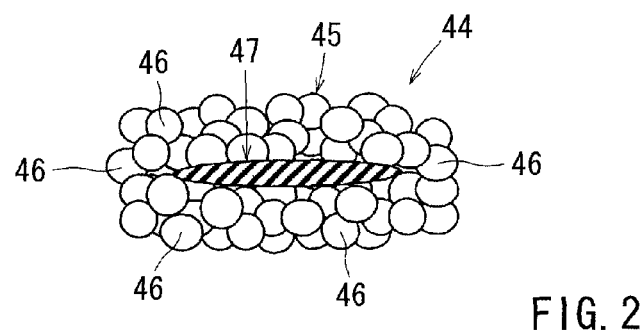
FIG. 2 is a partially cross-sectional schematic view showing a shaped heat storage material in the first embodiment.

As shown in FIG. 2, the shaped heat storage material 44 is made by shaping fine heat storage capsules 46 with a binder (not shown). The heat storage capsules 46 enclose phase-change materials capable of absorbing and releasing heat depending on temperature alteration therein. The heat storage capsules 46 can be made from known materials suitable for the heat storage capsule such as those disclosed in Japanese Laid-Open Patent Publication No. 2005-233106, so that the heat storage capsules 46 will not be described in detail. Although various materials can be used for the binder, thermosetting resin such as phenol resin or acrylic resin is preferable in light of strength and stability against temperature required for the adsorbent canister 10 and solvent. The shaped heat storage material 44 and the adsorbent 42 preferably have 0.1-1.5 g/cc of density, respectively. A ratio of the shaped heat storage material 44 to total amount of mixture of the adsorbent 42 and the shaped heat storage material 44 is preferably 5-40% by weight. The shaped heat storage material 44 can be shaped in accordance with known methods such as those disclosed in Japanese Laid-Open Patent Publication No. 2005-233106. For example, the shaped heat storage material 44 can be easily shaped by extruding mixture containing the heat storage capsules 46 and the binder into a continuous rod shape and then cutting such extruded product in a predetermined length. Thus, the shaped heat storage material 44 is basically formed in a prism-like shape such as cylinder shape, polygonal prism or the like.

The shaped heat storage material 44 has a shaped body 45 composed of aggregated heat storage capsules 46 and a thin plate-shaped heat-transfer member 47 that is made from a high thermal conducting material and is disposed at a center region of the shaped body 45 (FIG. 2). That is, a number of the heat storage capsules 46 are disposed around the heat-transfer member 47. During manufacture of the shaped heat storage material 44, the heat-transfer member 47 is positioned in the shaped body 45 by burying the heat-transfer member 47 in the center region of the shaped body 45. The high thermal conducting material for the heat-transfer member 47 includes metal such as aluminum.

Next, operation of a fuel vapor treating system including the adsorbent canister 10 will be described (FIG. 1). The fuel vapor treating system is composed of the adsorbent canister 10, the vapor pipe 26, the fuel tank 27, the purge pipe 30, the air intake pipe 32 and purge valve 34, etc. When the internal combustion engine 31 is stopped, the fuel vapor, e.g., vaporized in the fuel tank 27 flows into the main chamber 17 via the vapor pipe 26. Then, most of the fuel vapor adsorbs onto the adsorbent 42 filled in the main chamber 17. Remaining fuel vapor that has not adsorbed onto the adsorbent 42 in the main chamber 17 flows into the auxiliary chamber 18 via the communication chamber 20 and then adsorbs onto the adsorbent 42 filled in the auxiliary chamber 18. In this state, increase in temperature of the adsorbent 42 caused by exothermal reaction where the fuel vapor adsorbs onto the adsorbent 42 can be suppressed by endotherm caused by phase change (from solid phase to liquid phase) of the phase-change material in the heat storage capsules 46 of the shaped heat storage material 44. Thus, it is able to improve adsorption performance of the adsorbent 42 for the fuel vapor.

In a state that the internal combustion engine 31 is running, when the purge valve 34 is opened, negative pressure in the internal combustion engine 31 can act on the adsorbent canister 10 via the purge pipe 30. Accordingly, ambient air is introduced into the auxiliary chamber 18 via the air communicating port 24. The air introduced into the auxiliary chamber 18 desorbs the fuel vapor from the adsorbent 42 filled in the auxiliary chamber 18. And then, the air flows into the main chamber 17 via the communication chamber 20 and desorbs the fuel vapor from the adsorbent 42 filled in the main chamber 17. In this state, decrease in temperature of the adsorbent 42 caused by endothermal reaction where the fuel vapor is desrobed from the adsorbent 42 is prevented due to exotherm caused by phase change (from liquid phase to solid phase) of the phase-change material enclosed in the heat storage capsules 46 of the shaped heat storage material 44. Thus, it is able to improve desorption performance where the fuel vapor is desorbed from the adsorbent 42. The air mixed with the fuel vapor that has been desorbed from the adsorbent 42 is discharged (i.e., purged) into the air intake pipe 32 via the purge pipe 30 and then is burned in the internal combustion engine 31.

The shaped heat storage material 44 (FIG. 2) used for the adsorbent canister 10 (FIG. 1) is made by enclosing phase-change materials capable of absorbing and releasing heat depending on temperature alteration into microcapsules in order to make fine heat storage capsules 46 and then shaping the heat storage capsules 46 and the heat-transfer member 47 with the binder such that the heat storage capsules 46 are disposed around the heat-transfer member 47 made from the high thermal conducting material. Thus, the heat-transfer member 47 can improve heat-transfer efficiency in the shaped body 45 composed of the heat storage capsules 46. Accordingly, it is able to effectively utilize latent heat of the phase-change material in the heat storage capsules 46.

The heat-transfer member 47 extends from the center region to a surface region of the shaped body 45, so that it is able to improve heat-transfer efficiency in the shaped body 45. In detail, the heat-transfer member 47 can rapidly transfer heat between the center region and the surface region of the shaped body 45. Although the number of the heat-transfer member 47 is one in this embodiment, the shaped body 45 can have a plurality of heat-transfer members 47.

The heat-transfer member 47 is formed in a thin plate shape, so that it is able to increase contact area between the heat storage capsules 46 and the heat-transfer member 47. The heat-transfer member 47 can be formed in other shape such as rod shape, granular shape, cylinder shape or hollow cylinder shape. In addition, the heat-transfer member 47 can be made from deformable material such that the heat-transfer member 47 can be deformed to fit the heat storage capsules 46 with the heat-transfer member 47.

The high thermal conducting material of the heat-transfer member 47 is metal such as aluminum, aluminum alloy, copper or copper alloy. Various materials each having high thermal conductivity such as carbon fiber (e.g., carbon nanotube) can be used for the high thermal conducting material for the heat-transfer member 47.

With respect to the adsorbent canister 10, mixture of the shaped heat storage material 44 and the granular-shaped adsorbent 42 is filled in the housing 12. Thus, because the shaped heat storage material 44 capable of effectively utilizing latent heat of the heat storage capsules 46 is mixed with the adsorbent 42 and filled in the housing 12, it is able to improve desorption performance for the fuel vapor of the adsorbent 42.

Figure 3:
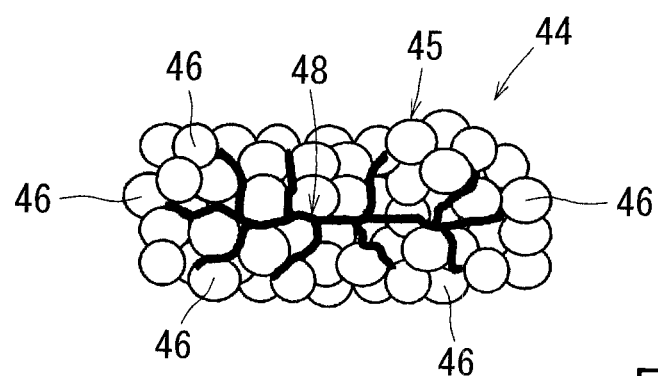
FIG. 3 is a partially cross-sectional schematic view showing the shaped heat storage material in a second embodiment.

A second embodiment will be described. As shown in FIG. 3, a heat-transfer member 48 is formed in an optionally-branched fibrous shape in this embodiment. The heat-transfer member 48 is disposed in the shaped body 45 such that the heat-transfer member 48 extends from the center region to the surface region of the shaped body 45. The shaped heat storage material 44 can be made by mixing the heat-storage member 48 and the heat storage capsules 46 with a binder and then shaping such mixture. Thus, the heat-storage member 48 is often exposed on the surface of the shaped body 45. The heat-transfer member 48 is made from high thermal conducting materials. Preferably, the heat-transfer member 48 is made from metal materials such as aluminum, aluminum alloy, copper or copper alloy or carbon fiber materials such as carbon nanotube.

The heat-storage material 44 of this embodiment can have substantially same effect as those in the first embodiment. The heat-transfer member 48 is disposed in the shaped body 45 such that the heat-transfer member 48 continuously extends from the center region to the surface region of the shaped body 45. Thus, the heat-transfer member 48 can rapidly transfer heat between the heat storage capsules 46 disposed in the surface region and the heat storage capsules 46 disposed in the center region. In addition, by filling mixture of the shaped heat storage material 44 and the adsorbent 42 into the adsorbent canister 10, it is able to improve adsorption performance and desorption performance for the fuel vapor of the adsorbent 42.

Because the heat-transfer member 48 is formed in fibrous shape, it is able to increase contact area between the heat-transfer member 48 and the heat storage capsules 46. In addition, the heat-transfer member 48 can be easily deformed to fit the heat storage capsules 46. A plurality of the heat-transfer members 48 can be disposed in the shaped body 45. In a case that the shaped body 45 includes a plurality of the heat-transfer members 48, although the heat-transfer members 48 preferably contact with each other, the heat-transfer members 48 can be disposed to avoid contact with each other.

Figure 4:
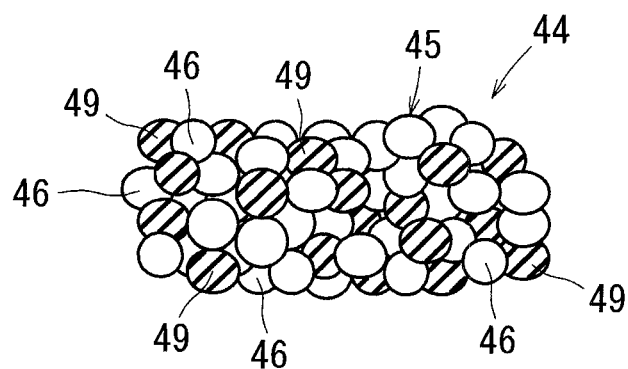
FIG. 4 is a schematic view showing the shaped heat storage material in a third embodiment.

A third embodiment will be described. As shown in FIG. 4, the shaped heat storage material 44 has a number of heat-transfer members 49 each formed in granular shape or powder shape. The heat-transfer members 49 are distributed throughout the whole of the shaped body 45. The shaped heat storage material 44 can be made by mixing a number of the heat storage capsules 46 and the heat-transfer members 49 with a binder and then shaping such mixture. The heat-transfer members 49 are made from a high thermal conducting material. Preferably, the heat-transfer members 49 are made from metal materials such as aluminum, aluminum alloy, copper or copper alloy. In addition, carbon fibers can be used for the heat-transfer members 49, e.g., by shaping carbon fibers into granular shape.

The shaped heat-storage material 44 of this embodiment can have substantially same effect as those in the first embodiment. In addition, because the heat-transfer members 49 are distributed throughout the whole of the shaped body, it is able to improve heat conductivity between the center region and the surface region of the shaped body 45.

Each of the heat-transfer members 49 is formed in granular shape or powder shape. Thus, the heat-transfer members 49 can be easily mixed with the heat storage capsules 46, so that it is able to improve formability of the shaped heat storage material 44.

The shaped heat storage material 44 of this disclosure can applied to other apparatuses each requiring a heat storage ability, e.g., for coolant water used for the internal combustion engine, engine oil, transmission oil, or air for air conditioner. In the described embodiment, although the fuel vapor desorbed from the adsorbent is flowed into the air intake pipe, the fuel vapor desorbed from the adsorbent can be flowed into another device (for example, a recovery apparatus for condensing the fuel vapor) due to action of a suction pump. In addition, it is able to shape the heat-transfer members in various shapes other than those described above, for example, C-shape, H-shape, L-shape, X-shape, lattice shape or combination thereof.

This invention claims:

1. A shaped heat storage material comprising:
    a heat-transfer member made from a high thermal conducting material; and
    heat storage capsules that contains therein phase-change material capable of adsorbing and releasing heat depending on temperature alteration and are disposed around the heat-transfer member.

2. The shaped heat storage material according to claim 1, wherein the heat-transfer member is positioned in a center region of the shaped heat storage material.

3. The shaped heat storage material according to claim 1, wherein the heat-transfer member extends from a center region of the shaped heat storage material to a surface region of the shaped heat storage material.

4. The shaped heat storage material according to claim 1 further comprising a plurality of the heat-transfer members, wherein the heat-transfer members are distributed throughout the whole of the shaped heat storage material.

5. The shaped heat storage material according to claim 1, wherein the heat-transfer member is formed in thin plate shape, fibrous shape, line shape, granular shape, powder shape, cylinder shape or hollow cylinder shape.

6. The shaped heat storage material according to claim 1, wherein the high thermal conducting material is metal or carbon fiber.

7. An adsorbent canister comprising:
    a housing;
    an adsorbent filled in the housing; and a shaped heat storage material mixed with the adsorbent and filled in the housing, wherein the shaped heat storage material is composed of a heat-transfer member that is made from a high thermal conducting material and heat storage capsules that contains therein phase-change material capable of adsorbing and releasing heat depending on temperature alteration and are disposed around the heat-transfer member.

\* \* \* \* \*